Sept. 8, 1936.  J. H. MANNING  2,053,571

LOCK FOR TRAILER SUPPORTS

Filed Feb. 17, 1936   2 Sheets-Sheet 1

Inventor
Joseph H. Manning

By Blackmore, Spencer & Flint
Attorneys

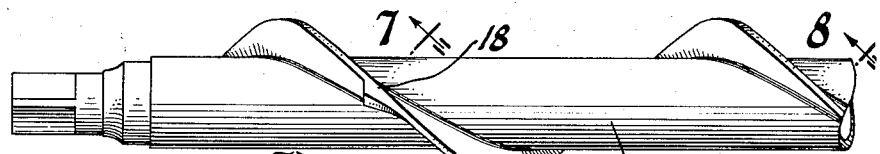
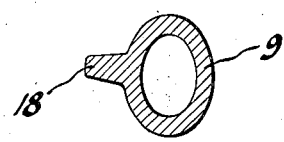
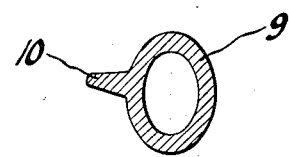
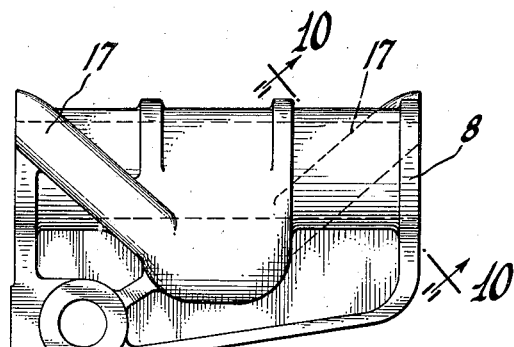
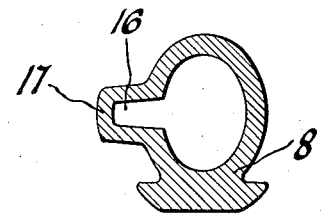
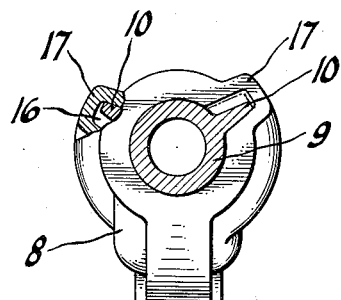

Patented Sept. 8, 1936

2,053,571

UNITED STATES PATENT OFFICE 2,053,571

LOCK FOR TRAILER SUPPORTS

Joseph H. Manning, Pontiac, Mich., assignor to General Motors Truck Corporation, Pontiac, Mich., a corporation of Delaware Application February 17, 1936, Serial No. 64,261

6 Claims. (Cl. 280—33.1)

This invention relates to motor vehicles, and more particularly to tractor trailer combinations of the type wherein the load is transported in a semi-trailer supported by road wheels at the rear and through a detachable fifth wheel coupling at the front upon a tractor. Interchangeable equipment of this kind necessitates the use of supporting props for the front of the semi-trailer when the tractor is uncoupled. Retractible props to be raised and lowered automatically with the coupling and uncoupling operations have been proposed heretofore and the present invention has to do with a detail improvement in the structure of landing gear operating mechanism and was designed particularly with reference to automatic equipment, following generally the disclosures in certain Wilson-Land patents as, for example, Numbers 1,753,011 and 1,895,762.

In this instance, the landing gear involves a swinging frame pivoted near the forward end of the trailer and connected by a drag link with a traveling block, whose longitudinal movement raises or lowers the frame. Linear motion is imparted to the block through its threaded engagement with a helical rib or thread on a rotatable shaft, and for automatic actuation the shaft may be provided with another helical formation engageable slidably by a member which travels linearly with the tractor upon relative movement between the tractor and trailer during the coupling and uncoupling operations, whereby the shaft is rotated in one direction or the other. When the frame is swung downwardly as the tractor moves from under the trailer, it is desirable that some means be provided to act automatically for locking the frame in the lowered position against accidental retraction during the time load is carried thereby and which, furthermore, releases the parts without manual attention for the elevation of the supports as the tractor is again backed under and coupled to the trailer. An improved actuating mechanism embodying as an important feature a positive and reliable locking arrangement constitutes the subject matter hereof, and it was designed with the purpose of simplification in construction for ease and economy of production and the elimination of need for precise accuracy in manufacture.

Figure 1:
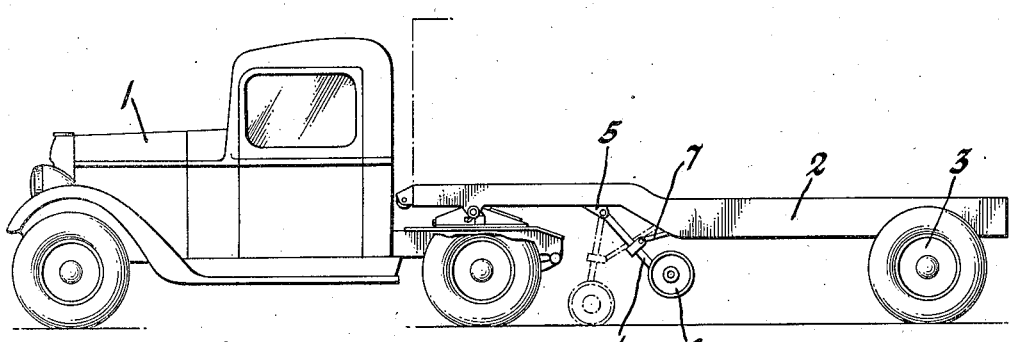
Figure 2:
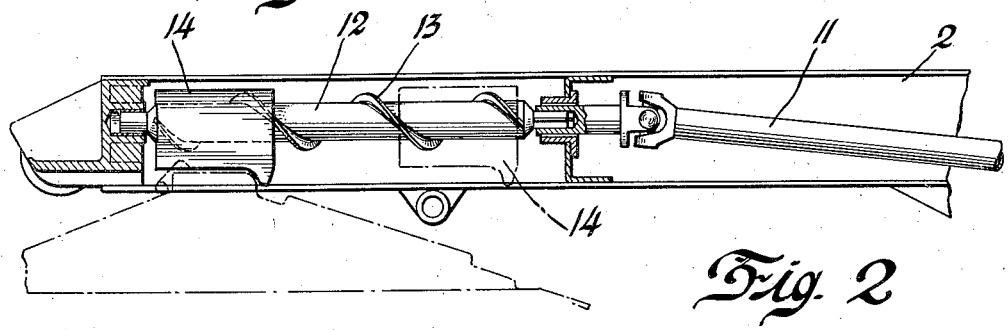
Figure 3:
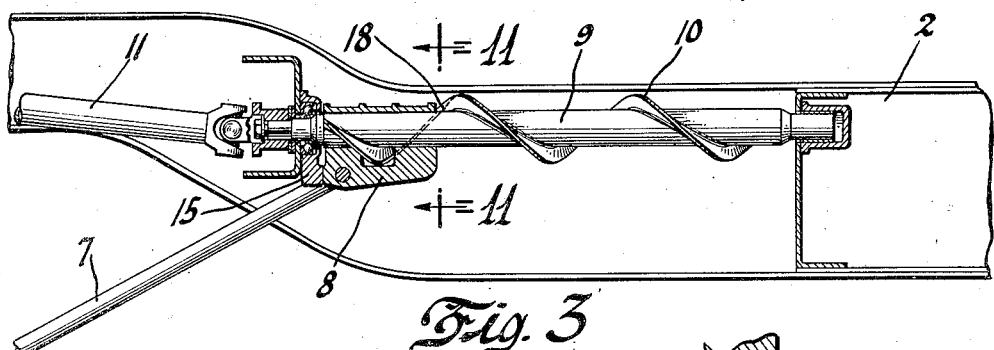
Figures 4, 5:
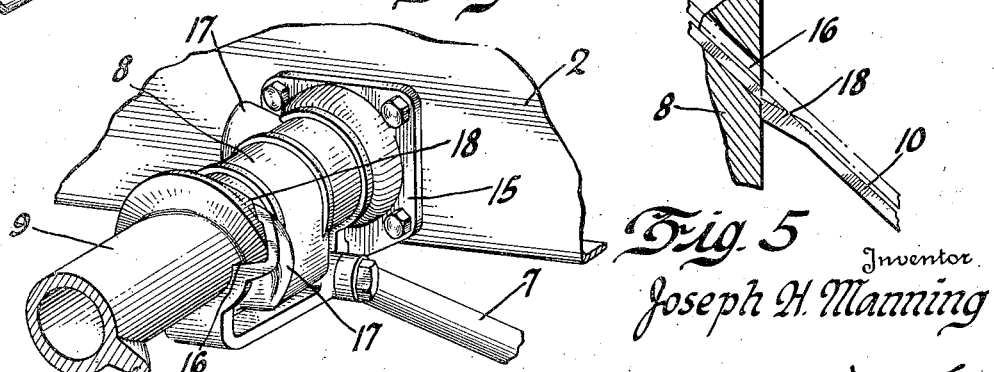

For a better understanding of the invention reference may be had to the accompanying drawings wherein Figure 1 is a side elevation of a tractor and trailer in coupled relation; Figures 2 and 3 are detail sectional views on a larger scale of the actuating mechanism for the swinging prop; Figure 4 is a perspective view showing the traveling block supported upon its actuating shaft in the position assumed when the props are dropped; Figure 5 is a detail view showing a development of the helical rib formation in cooperative relation with the traveling block; Figure 6 is a view showing a portion of the actuating shaft; Figures 7 and 8 are sectional views taken on line 7—7 and line 8—8, respectively, of Figure 6; Figure 9 shows the traveling block in elevation; Figure 10 is a section on line 10—10 of Figure 9, and Figure 11 is a view taken on line 11—11 of Figure 3.

In the drawings the numeral 1 indicates a truck tractor supporting through a suitable fifth wheel structure the forward end of a trailer 2, whose rear end is mounted upon road wheels 3. Beneath the forward end of the trailer is a swinging frame structure 4 pivoted at one end as at 5 to the trailer and provided at its opposite end with ground wheels 6 or the like. Extending rearwardly from the swinging frame 4 are a pair of drag links 7 connected to a traveling nut or block 8 for swinging the wheels upon movement of the block. This block 8 is supported upon a rotatable shaft section 9 mounted in suitable bearings in the frame of the trailer 2 and provided with a helical rib 10 through which rotation of the shaft 9 imparts a linear motion of the block 8.

A coupling shaft 11 is connected by universal joints at opposite ends to the shaft 9 and to a similar shaft 12 mounted in the frame directly above the fifth wheel coupling. The helical rib 13 on the shaft section 12 is engaged by a traveling block or nut 14 adapted to be carried by the tractor during the coupling and uncoupling operations. The particular type of fifth wheel used is relatively unimportant to the invention and in this connection it may be pointed out that the shaft section 12 may, for convenience, be provided with the helical groove to receive the end of a king pin carried by the lower fifth wheel member on the tractor to effect shaft rotation.

When the traveling block 14 is in the dotted line position as seen in Figure 2, the shaft is held against rotation by reason of the interengagement of the fifth wheel parts, whereby the swinging supporting frame 4 is retained in its retracted position. The full line positions illustrated in Figures 2 and 3 indicate the relation of parts when the props are lowered. In this relation the contact of the prop with the ground is over center or forward of the pivotal axis 5, and the gravity load exerts a forward thrust on the drag links 7 which holds the block 8 against the frame abutment bracket 15 whereby collapse of the supporting frame is prevented.

In this supported position of the parts, should the trailer be jostled forward, particularly if it is resting on soft or uneven ground, there may occur a tendency for the support to swing rearwardly about its pivot 5 and, therefore, some means must be provided to resist the rearward thrust of the block 8 and its consequent rotation of the shaft 11 which otherwise would allow the front end of the trailer to drop to the ground. To guard against this occurrence the interengaging helical formations in the traveling block 8 and its supporting shaft 9 are specially designed to lock the parts in their forward limit against relative movement under influence of a rearward thrust on the block. Accordingly the rib receiving opening 16 constituted by cooperating internally grooved annular enlargements 17 on opposite sides of the nut 8 is considerably wider than the width of the rib 10 throughout its major extent so as to have a sloppy fit thereon, and the rib at a predetermined point is provided on one side thereof with an enlargement 18, shaped to afford a ramp on one side and a shoulder or seat on the other side for abutment with the end face of the block. The relative proportions of the rib 10 and its enlargement or ratchet tooth 18, and the opening 16 therefor, can be seen in the sectional views Figures 8, 7, and 10, respectively.

In the movement of the parts to retract the landing gear the coupling operation will impart to the shaft 9 a clockwise direction, as seen in Figure 4, which first moves the abutment 18 out of contact with the nut and then by reason of the engagement between the cooperating faces of the rib 10 and opening 16, as illustrated by the broken lines in Figure 5, the continued rotation of the shaft shifts the traveling block 8 rearwardly and through the drag link 7 lifts the supporting frame to the elevated position.

During the uncoupling operation, the forward movement of the tractor 1 in relation to the trailer 2, gives a reverse direction of rotation to the shaft 9, whereupon the previously engaging faces of the rib 10 and opening 16 move out of contact and the opposite faces thereof then engage and the camming action of the rib on the nut moves the block forward until the supported frame is fully lowered. In the final rotation of the shaft the nut 8 rides up and beyond the ramp on the abutment 18 and the abutment then passes beyond the side of the opening 16 and engages the rear face of the nut. In this position of the parts, any rearward thrust upon the nut, tending to act on the helical rib, is imposed on the jamming abutment or ratchet tooth 18, rather than on the helical rib and a camming action to rotate the shaft and free the nut is blocked, whereby the nut remains in its forward limit and the support held in lowered position against accidental retraction.

I claim:

1. In a tractor trailer organization having means for automatically operating retractible supporting gear, a rotatable shaft operated upon relative movement of the tractor and trailer, a helical formation on said shaft, a nut having a portion loosely fitting said formation for the axial movement thereof upon shaft rotation and a shoulder on said formation adapted to abut a seat on the nut to lock the nut in a predetermined position.

2. In a tractor trailer organization having means for automatically operating retractible supporting gear, a rotatable shaft operated upon relative movement of the tractor and trailer, a shiftable sleeve surrounding said shaft, camming elements on the shaft and sleeve, respectively, for engagement with each other to shift the sleeve upon shaft rotation and stop means on said camming elements effective as a lock in a predetermined relative position thereof.

3. In a tractor trailer organization, means for operating the trailer supporting props, including a rotatable screw, a traveling nut on said screw and interengaging stop means on the screw and nut acting automatically upon screw rotation in one direction to lock the nut against travel from one limit and upon reverse rotation of the screw to unlock the nut for travel on the screw.

4. Operating mechanism for a trailer support, including a rotatable shaft having a helical rib, a traveling block supported on the shaft and provided with spaced rib engaging surfaces, one of said surfaces being adapted for sliding engagement with one side of the rib upon rotation of the shaft in one direction to impart movement to the block and the other surface having sliding engagement with the other side of the rib upon reverse shaft rotation to move the block in a return direction, and a seat on one side of the rib adapted when the block rides therebeyond incident to shaft rotation in one direction, to engage and lock the block until shaft rotation is reversed.

5. Operating mechanism for a trailer support, including a traveling block, a rotatable shaft supporting the block and having a helical formation selectively engageable on one side or the other with the block dependent upon direction of shaft rotation, to impart lineal motion to the block in either direction, and a block seating portion on said formation adapted to engage the block near the limit to which it is moved by its engagement with one side of said formation and thereafter resist thrust on the block toward the other limit until such time as the other side of the formation is brought into motion transmitting relation with the block.

6. Operating mechanism for a trailer support, including a traveling block, a rotatable shaft supporting the block and having a helical formation selectively engageable on one side or the other with the block dependent upon direction of shaft rotation, to impart lineal motion to the block in either direction, and a ratchet tooth on one side of said formation to engage and lock the block near one limit of its travel.

JOSEPH H. MANNING.